United States Patent
Galin et al.

(10) Patent No.: US 7,684,416 B2
(45) Date of Patent: Mar. 23, 2010

(54) SYSTEM FOR AUTOMATICALLY IDENTIFYING THE PHYSICAL LOCATION OF NETWORK END DEVICES

(75) Inventors: Liam Galin, Herzliya (IL); Nitzan Cafif, Kfar Azar (IL)

(73) Assignee: Rit Technologies Ltd., Tel-Aviv (IL)

( * ) Notice: Subject to any disclaimer, the term of this patent is extended or adjusted under 35 U.S.C. 154(b) by 915 days.

(21) Appl. No.: 10/433,110

(22) PCT Filed: Dec. 4, 2001

(86) PCT No.: PCT/IL01/01119

§ 371 (c)(1),
(2), (4) Date: Aug. 21, 2003

(87) PCT Pub. No.: WO02/47331

PCT Pub. Date: Jun. 13, 2002

(65) Prior Publication Data

US 2005/0030955 A1 Feb. 10, 2005

Related U.S. Application Data

(60) Provisional application No. 60/251,444, filed on Dec. 5, 2000.

(51) Int. Cl.
 *H04L 12/28* (2006.01)
(52) U.S. Cl. ........................ 370/401; 370/252; 709/224
(58) Field of Classification Search ................. 370/227, 370/254, 255, 356, 389, 395.3, 395.31, 216, 370/218, 355, 338, 401; 709/223, 224; 714/4; 726/12
See application file for complete search history.

(56) References Cited

U.S. PATENT DOCUMENTS 5,483,467 A   1/1996   Krupka et al.
5,706,440 A   1/1998   Compliment et al.
5,796,736 A   8/1998   Suzuki (Continued)

*Primary Examiner*—Ricky Ngo
*Assistant Examiner*—Kan Yuen
(74) *Attorney, Agent, or Firm*—Pearl Cohen Zedek Latzer, LLP

(57) ABSTRACT

Method and system for automatically identifying the physical location and/or end-to-end connectivity of end-devices, each of which having a unique ID and, normally, being connected to an access point of a network, each access point having a known physical location and being connected to a port of a Switch. Whenever required, the physical location of each end-device is updated.

14 Claims, 6 Drawing Sheets

U.S. PATENT DOCUMENTS

| | | | |
|---|---|---|---|
| 5,884,297 A * | 3/1999 | Noven | 370/395.3 |
| 5,961,597 A | 10/1999 | Sapir et al. | |
| 5,961,608 A * | 10/1999 | Onosaka et al. | 709/249 |
| 6,101,170 A * | 8/2000 | Doherty et al. | 370/255 |
| 6,359,711 B1 * | 3/2002 | Cole et al. | 398/58 |
| 6,418,139 B1 * | 7/2002 | Akhtar | 370/356 |
| 6,426,955 B1 * | 7/2002 | Gossett et al. | 370/401 |
| 6,477,486 B1 * | 11/2002 | Ram et al. | 702/188 |
| 6,493,340 B1 * | 12/2002 | Kawanaka | 370/392 |
| 6,549,513 B1 * | 4/2003 | Chao et al. | 370/227 |
| 6,636,894 B1 * | 10/2003 | Short et al. | 709/225 |
| 6,742,134 B1 * | 5/2004 | Pothier et al. | 714/4 |
| 6,982,953 B1 * | 1/2006 | Swales | 370/218 |
| 7,130,385 B1 * | 10/2006 | Moon | 379/45 |
| 7,143,153 B1 * | 11/2006 | Black et al. | 709/223 |
| 7,194,554 B1 * | 3/2007 | Short et al. | 709/246 |
| 2001/0011010 A1 * | 8/2001 | Takekawa et al. | 455/67.1 |
| 2001/0029534 A1 * | 10/2001 | Spinks et al. | 709/224 |
| 2002/0009078 A1 * | 1/2002 | Wilson et al. | 370/389 |
| 2002/0035699 A1 * | 3/2002 | Crosbie | 713/201 |
| 2003/0218989 A1 * | 11/2003 | El-Amawy et al. | 370/255 |
| 2005/0117576 A1 * | 6/2005 | McDysan et al. | 370/389 |

* cited by examiner

SYSTEM FOR AUTOMATICALLY IDENTIFYING THE PHYSICAL LOCATION OF NETWORK END DEVICES

CROSS-REFERENCE TO RELATED APPLICATIONS

This application is a National Phase Application of PCT International Application No. PCT/IL01/01119, International Filing Date, Dec. 4, 2001, claiming priority of U.S. Provisional Application 60/251,444, filed Dec. 5, 2000.

FIELD OF THE INVENTION

The present invention relates to the field of managing and controlling network devices. More particularly, the present invention relates to a method and system for automatically identifying the physical location and end-to-end physical connectivity of end-devices having a unique IDentification (ID) and connected to a network.

BACKGROUND OF THE INVENTION

The "layer" terminology used hereinafter refers to one of the seven layers in the International Standard Organization (ISO) Open System Interconnect (OSI) communication model (often called "the seven-layer model"), according to which computerized data networks operate. According to the OSI model, the "Physical layer" is called layer-1, which is referred to as the lowest layer.

The "end-device" (or sometimes just "device") terminology used hereinafter refers to data devices/terminals having a unique ID, which could be connected to, and identified by, a data network. Such end-devices are, for example, a server, a printer, a Facsimile machine, a personal computer, a workstation and, in general, IP-based devices (e.g. IP-based telephone).

Computer network management tools have traditionally focused on the upper layers of the OSI communication model. Current management tools, such as those based on Simple Network Management Protocol (SNMP), offer a solution for Internet Protocol (IP) based networks, regarding routing data within Virtual Local Area Networks (VLAN). Wide Area Network (WAN), Local Area Network (LAN) and Data-Link layer media Access protocols like Ethernet, Token-Ring and alike, are also comprehensively covered by conventional Network Management Tools. However, the physical (i.e. the first) layer management is a field that is not adequately covered; i.e., current technologies cover only partially this aspect.

In general, a network comprises physical sections that are commonly referred to as 'static connections'. For example, a cable passing through a wall of a building is considered to be a static connection, since the cable and its two end-points are not likely to be removed, or changed, (reference numerals 3 and 15/1 to 15/n in FIG. 1). Other physical sections of the network are commonly referred to as 'dynamic connections'. For example, a data cable having one of its end-points connected to a computer is considered to be a dynamic connection since the computer, such as reference numeral 16/1 (FIG. 1) is portable and is likely to be connected to different data outlets (15/1 to 15/n, FIG. 1) that are installed. For example, in different rooms (reference numeral 2, FIG. 1). Another example for a dynamic connection is an array of cords for interconnecting between ports of two interconnect devices (Panels), such as reference numeral 1, shown in FIG. 1.

Referring again to FIG. 1, Multi-port switch 10, Patch Panels (PP) 11 and 12 and telecommunication outlets 15 are stationary devices. The data cables in cabling sections 3 and 4 are stationary, and the data cables in cabling sections 1 and 2 are transferable (i.e., dynamic), thereby allowing flexibility when adding an end-device 16, changing the service provided to such end-device, or changing the physical location of such end-devices. In some data networks, in which only a single Patch Panel is used, Patch Panel 11 effectively, coincides with (not shown) the switch ports 10/1, and the set of connections between the switch ports 10/1 and the remaining Patch Panel 12 becomes dynamic.

A partial solution has been provided for monitoring the dynamic portion of the physical links of a data/communication network, i.e., for section 1 (FIG. 1). However, determining the End-to-End physical link, such as a physical link from port 10/1 to end-device 16/1 (FIG. 1) requires also determining the presence of an end-device, as well as its physical links to the outlet 15 (segment 2 in FIG. 1).

U.S. Pat. No. 5,483,467 discloses a way for determining the dynamic physical connections (26, FIG. 1) between contacts of a first Patch Panel (PP) like switching board (20, FIG. 1) and ports of a second PP like switching board (16, FIG. 1). However, the status of the physical connection to the workstations (24, FIG. 1), and in particular the information related to the physical location and end-to-end connectivity of an active end-device at the end of each physical connection, are left undetermined.

It is an object of the present invention to provide a system for automatically identifying the physical location of devices, which are connected to a network.

It is another object of the present invention to provide a system for automatically identifying changes in the physical location of devices, which are connected to a network.

It is a further object of the present invention to provide a system for automatically obtaining stored and/or updated data, related to the physical location of active devices, which are connected to a network.

It is still another object of the present invention to provide a system for determining complete end-to-end physical links that are utilized as a network infrastructure.

Other objects and advantages of the invention will become apparent as the description proceeds.

SUMMARY OF THE INVENTION AND ADVANTAGES

The term 'subnet', wherever used, refers to a basic Local Area Network (LAN) system that comprises a (data) Switch, a plurality of end-devices and (optionally) a cross-connection means by which each end-device is allowed to communicate with a port of the Switch.

By using the term 'Switch', it is meant to include any network device being capable of directing data, to its next or its final destination, such as a bridge and the like.

By using the term 'unique ID', it is meant to include any unique identification data of an end-device that can be used to distinguish said end-device from other end-devices connected to the data network. According to one aspect of the invention, the unique ID is the MAC address of the end-device(s).

The present invention is directed to a method for automatically identifying the physical location and/or end-to-end connectivity of end-devices, each of which having a unique ID and, normally, being connected to an access point of a network, each access point having a known physical location and being connected to a port of a Switch (in some cases, however, an end-to-end physical link may be obtained without requiring the access points location).

A first data that represents the relation between the unique ID of each end-device (that is connected to a corresponding port in the Switch) and the port, is stored in a storage means. A first set of separate contacts, capable of being represented, whenever desired, by switch ports, and a second set of separate contacts, capable of being represented, whenever desired, by access points, the first and second sets are capable of being cross-connected by corresponding data cords, are provided, for allowing changes in connecting end-devices to ports of the switch. Whenever desired, ports of the switch are connected to contacts of the first set and access points are connected to contacts of the second set. Predetermined contacts of the first and second sets are cross connected, and a second data, being the cross-connection data and representing the current cross-connection status between the sets and relating ports of the switch to corresponding access points, is obtained and stored.

A Connectivity Table (CT), containing a third data that represents the end-to-end connectivity of each end-device that is connected to one of the access points, is generated, by utilizing the first and second data. Whenever required, the physical location of each end-device obtained by using the third data is updated according to changes in the first and/or in the second data.

The first data may be stored in the Bridge Table (BT) of the Switch, and may be updated automatically by sending data from active end-devices through the corresponding ports of the switch. The first data may be, or may contain, the unique IDs of the end-devices. The unique ID may be, for example, the MAC address of the end-device.

The first data may be updated automatically by sending interrogation messages, and receiving data containing the unique ID from each active end-device that is connected to an access point, in response to the interrogation messages. More than one end-device may be connected to the same access point. A main computer may be utilized for allowing handling the first, second and third data.

The second data may be updated automatically by transmitting signals to one or more contacts of the first, or second, set of contacts, and receiving corresponding signals at the second, or first, set of contacts, respectively.

In general, each end-device may be represented by its corresponding IP address, and the IP addresses might be used for sending interrogation messages to one or more end-devices. According to one aspect of the invention, the Switch is connected to a port of a Router, for representing each end-device by its corresponding IP address, and/or for using the IP addresses contained in the Router for sending interrogation messages to one or more end-devices.

Whenever a change in the first data is detected, information representing a corresponding change in the physical location of an end-device is obtained by:
 a) obtaining the current second data, and comparing the data to the previously obtained second data;
 b) if no corresponding change is identified in the second data, updating the storage array with the corresponding change in the physical address; otherwise
 c) maintaining the previous content of the storage array.

Whenever a change in the second data is detected, information representing a corresponding change in the physical location of an end-device is obtained by:
 a) seeking changes in the current first data;
 b) if no corresponding change is identified in the first data, obtaining information related to a change in the physical location of each device according to the deviations from the corresponding change; otherwise
 c) maintaining the previous end-device location.

The data network may comprise at least two Routers, which may be connected to each other by at least one data communication channel, and may communicate with each other by utilizing at least one type of data communication protocol. The corresponding first and second data are obtained from one or more Routers, each of which being associated with corresponding Switch and transceiver.

The present invention is also directed to a system for automatically identifying the physical location and/or end-to-end connectivity of end-devices, each of which having a unique ID and being connected to an access point of a network, each access point having a known physical location and being connected to a port of a Switch, that comprises:
 a) a storage means, for storing a first data being representative of the relation between the unique ID of each end-device, that is connected to a corresponding port in the Switch;
 b) a first set and a second set of separate contacts, the first set is capable of being represented, whenever desired, by switch ports, and the second set is capable of being represented, whenever desired, by access points, the first and second sets are capable of being cross-connected by corresponding data cords, for providing alternative communication paths between end-devices and ports of the switch, the first and second sets being connected to ports of the Switch, and to access points, respectively;
 c) data cords, for cross-connecting between corresponding contacts of the first and second sets, and for providing alternative communication paths between end-devices and ports of the switch;
 d) means, for obtaining and storing a second data, the data being the cross-connection data that represents the current cross-connection status between the sets, the data relating ports of the Switch to corresponding access points and stored in the second means; and
 e) means for storing a Connectivity Table (CT), for producing a third data, the data being updated by utilizing the first and second data that are stored in the first and second means, respectively, the third data being a reflection of the physical location and end-to-end connectivity of each end-device that is connected to one of the access points.

The first data may be updated automatically by sending data from active end-devices through the corresponding ports of the switch, the data being, or containing, the unique IDs of the end-devices.

The first data may be updated automatically by sending interrogation messages, and receiving data containing the unique ID from each end-device that is connected to an access point, in response to the interrogation messages. More than one end-device may be connected to the same access point.

The second data may be updated automatically by transmitting signals to one or more contacts of the first, or second, set of contacts, and receiving corresponding signals at the second, or first, set of contacts, respectively.

In general, each end-device may be represented by a corresponding IP address, and the IP addresses might be used for sending interrogation messages to one or more end-devices. According to one aspect of the invention, the Switch is connected to a port of a Router, for representing each end-device by its corresponding IP address, and/or for using the IP addresses contained in the Router for sending interrogation messages to one or more end-devices.

The data network may comprise at least two Routers, which may be connected to each other by at least one data communication channel, and they may communicate with each other by utilizing at least one type of communication protocol. A personal computer (PC) may be allowed to communicate with at least one of the latter Routers, for obtaining the corresponding first and second data from each Router and its associated switches.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

The invention is directed to a method for determining the physical location of devices having unique ID, which are connected to a data network, and their End-to-End physical connectivity.

Figure 1:
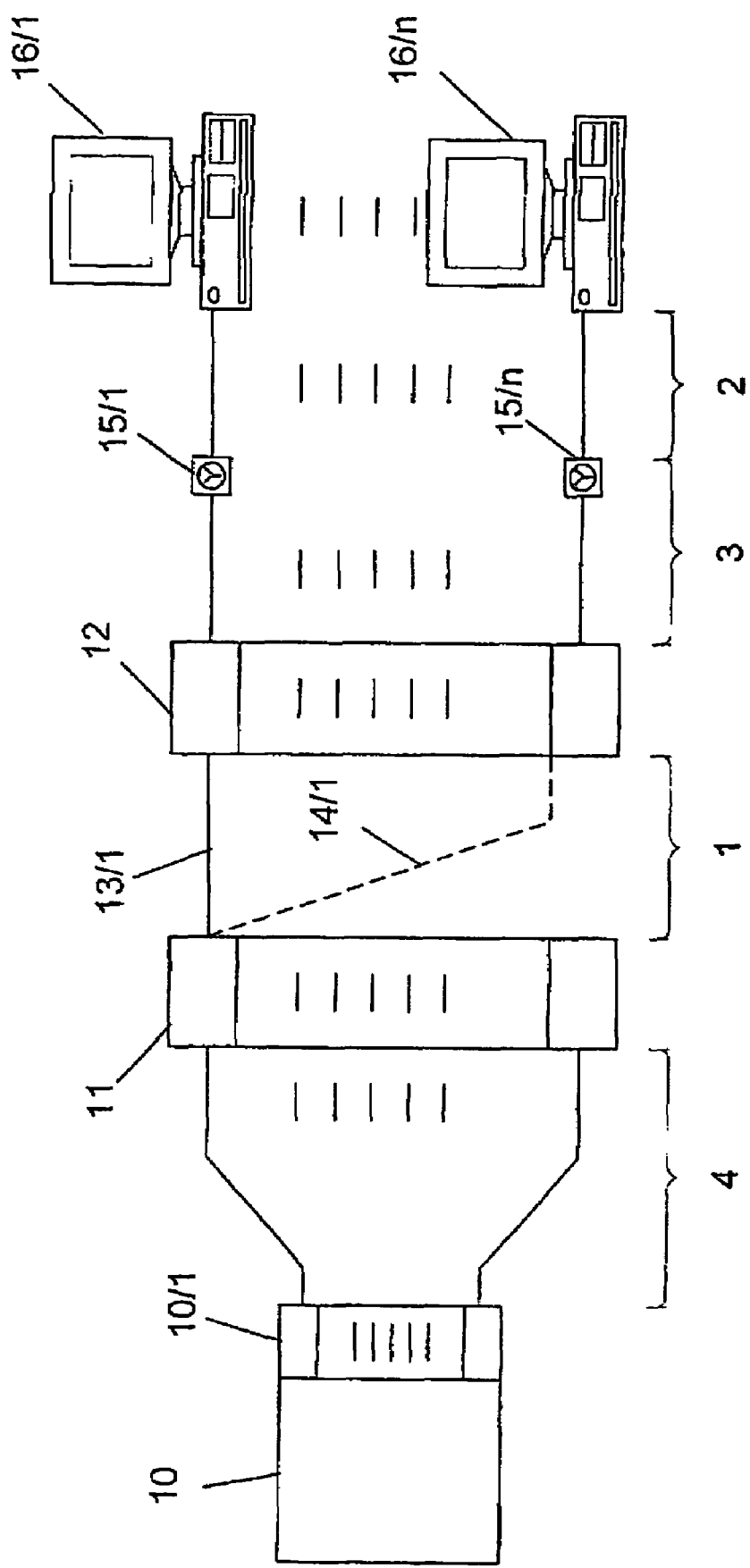
FIG. 1 (prior art) schematically illustrates an exemplary data network that comprises static and dynamic sections of physical links.
Figure 2A:
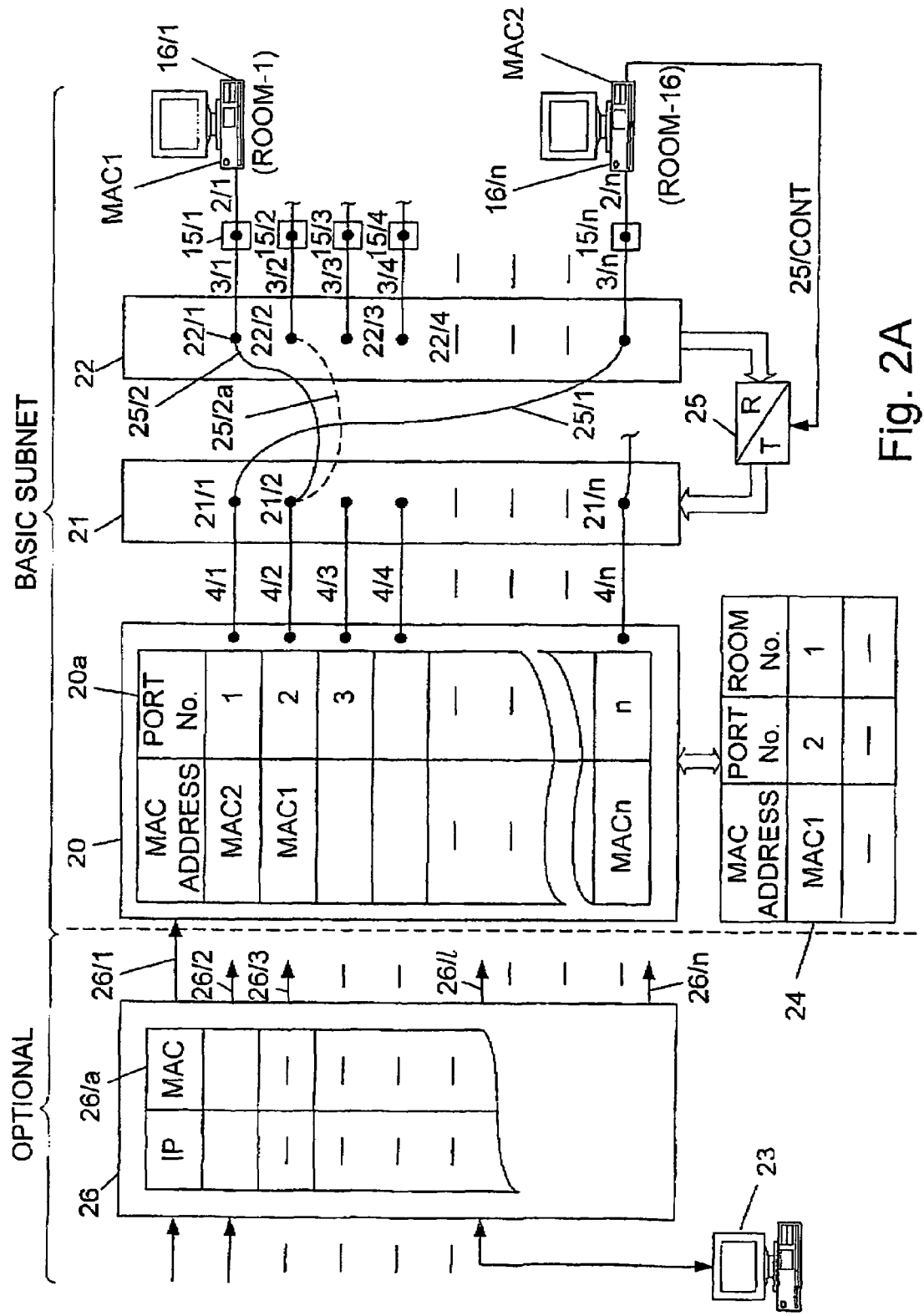
FIG. 2A schematically illustrates a system for determining the physical location of an IP-based data device that is connected to a data network, and its end-to-end physical links, according to a preferred embodiment of the invention.

FIG. 2A schematically illustrates a system for determining the physical location of an IP-based device that is connected to a data network, and its end-to-end physical links, according to a preferred embodiment of the invention. The basic data network (normally a subnet) consists of Switch 20 (i.e., the 'gateway' of the subnet), that comprises data ports 1 to n, to which static data cords 4/1 to 4/n are connected, respectively, a first set of separate contacts 21/1 to 21/n and a second set of separate contacts 22/1 to 22/n (forming 'cross-connect' panels 21 and 22, respectively). Predetermined contacts in the first set of contacts 21 and predetermined contacts in the second set of contacts 22 are cross-connected, for allowing flexibility in connecting end-devices (e.g. 16/1) to the Switch 20. The basic data network further comprises transceivers block 25, connectivity table 24, in which the physical connectivity of end-devices 16/1 to 16/n, which are connected to panel 22 via access points 15/1 to 15/n and static data cords 3/1 to 3/n is contained.

Switch 20 is a conventional switch that includes a Bridge Table (BT) 20a, for holding a data that represents the relation between the unique ID of an end-device, which is connected to a corresponding port of the switch, and said port. For example, port-2 of Switch 20, in BT 20a, is associated with MAC address MAC1.

BT 20a is updated whenever an end-device, such as 16/1, sends a message through the switch port to which it is connected. BT 20a updates its content by associating each incoming MAC address with the corresponding Switch 20 port, and it maintains its content only for short periods (typically 300 seconds), for allowing inner LAN data to be routed directly to the port to which the destination device is connected. Router 26 is utilized for allowing computer 23 to obtain the data that is inherently stored in Router 26 (i.e., in its ARP table) for identifying the end devices being part of the subnets, defined in said Router (by the IP addresses of end-devices that correspond to each subnet). Since Routers are mainly directed to connect between several subnets, if only a single subnet should be mapped, the data usually stored in the Router's ARP table may be alternatively stored in one or more, or distributed between several, workstations, which are connected to said subnet. This data (the MAC to IP address relations) is obtained by receiving reply messages from end-devices, hence populating the ARP table of the initiating end device. Interrogation messages are sent by utilizing (e.g., sending the ping signals to) expected IP addresses (of the end-devices). The structure and functionality of Router 26 will not be further discussed since they are well known to those skilled in the art.

A storage means (which may be external or distributed between workstations of the subnet and/or network devices) is utilized for storing a first data that is retrieved from BT 20a, which has been updated in response to interrogation messages, sent to all devices connected to the Switch. The first data represents the relation between end-device(s) unique ID and the corresponding Switch port. Connectivity Table (CT) 24 maintains a third data that results by utilizing the first data and a second data, said second data representing the current cross-connections of panels 21 and 22, which is obtained by, e.g., a main control computer 16/n that also handles TRB 25 (e.g., by means of control bus 25/CONT, or) through the network. Therefore, CT 24 contains the complete end-to-end physical connectivity data of each end-device, including its physical location (e.g., ROOM-1). CT 24 may reside in a separate computer.

Router 26 is essential whenever two or more subnets (that can reside in different physical location) are part of an extended data network that should be scanned/mapped, but may be excluded whenever an individual subnet should be scanned. In a case where Router 26 is connected to Switch 20, handling the 'Physical Links Determination System' (PLDS) may be carried out by computer 23 that is connected, for example, to one of Router 26 ports (hence, to a different subnet), rather than by computer 16/n, or computers 16/n and 23 may share responsibilities. Alternatively, computer 23 may reside anywhere on the data network, provided that it will have direct, or indirect, access to all end-devices that should be mapped. The data usually stored in a Router's ARP table may be alternatively stored in an external storage array, as described hereinabove.

Whenever an end-device sends a message, its MAC address is saved at the Switch port. However, if computer 23 is connected to Router 26 and Router 26 is connected to Switch 20, computer 23 might send interrogation messages (e.g., 'pings') according to the IP addresses contained in the ARP table of Router 26, and retrieve the relevant data from Router 26.

Transceiver Block (TRB) 25 consists of transmitters array, for transmitting signals to one or more contacts of the first set of contacts in panel 21 (i.e., selected from contact 21/1 to 21/n), and receivers array, for receiving the corresponding signals from the corresponding contacts of the second set of contacts in panel 22 (i.e. selected from contacts 22/1 to 22/n). However, TRB 25 may be configured/programmed to transmit signals to contacts in panel 22, and to receive the signals from the corresponding contacts in panel 21. TRB 25 allows determining the current physical interconnections between panels 21 and 22. The structure and functionality of TRB 25 will not be discussed any further, since they are explained in detail in U.S. Pat. No. 5,483,467.

Whenever an end-device is transferred from one room to another, the cabling section between panels 21 and 22 is changed accordingly. In this case, the changes are transparent to switch 20; i.e., switch 20 will not identify any change because the MAC address of the end-device is still associated with the same port in switch 20. Therefore, no updating is required in its bridge table. For example, workstation 16/1, having MAC address MAC1, is connected to outlet 15/1 and, via link 25/2, to port 2 of switch 20, and the bridge table in switch 20 reflects the current status (i.e. MAC1 is associated with port 2 in switch 20). Switch 20 will not identify any change after connecting workstation 16/1 to outlet 15/2 and changing link 25/2 to 25/2a, since workstation 16/1 remains connected to port 2, via same port 21/2. If computer 16/n (or computer 23) will consider only the content of BT 20a, it will incorrectly assume that no change has occurred; i.e., that workstation 16/1 is still connected to outlet 15/1. However, by applying periodical (in real-time) reexamination of the interconnections between panels 21 and 22, the end-to-end table is maintained updated with changes occurring also between panels 21 and 22.

An end-device may be transferred to another location (i.e. connected to a different wall outlet 15 that is located in another room) without changing links between panels 21 and 22. For example, transferring workstation 16/1 (having MAC address MAC1) from wall outlet 15/1 to wall outlet 15/n. Accordingly, workstation 16/1 is connected via link 25/1 to port 1 of Switch 20. Prior the latter change, MAC address MAC1 was associated with port 2 in Switch 20, which is incorrect because MAC1 address should be associated now with port 1 of Switch 20. However, as end-device 16/1 initiates a message, the port on which it is located is updated with end-device 16/1 identification (i.e. its MAC address). Accordingly, BT 20a is updated for a short duration, during which storage array 24, or computer 23, retrieves and stores the required updated data. Alternatively, or additionally, computer 23 sends, via Router 26, interrogation messages and receives reply messages from the corresponding end-devices, that will cause Switch 20 to update BT 20a, thereby associating its ports with the (updated) MAC addresses of the corresponding end-devices. Accordingly, Switch 20 associates port 1 with the MAC1 address of workstation 16/1, by replacing MAC2 with MAC1 in its BT20a. Storage array 24, or computer 23 (i.e. if Router 26 is connected to Switch 20), is updated accordingly.

Another situation may occur when only changes in the links between panels 21 and 22 are executed. For example, exchanging between data cords end-points 22/1 and 22/n of links 25/2 and 25/1, respectively. Switch 20 will find, after sending interrogation messages by computer 23 (i.e. via Switch 20) through its ports 1 to n, that MAC address MAC1 has taken the place of MAC address MAC2 in port 1, and MAC address MAC2 has taken the place of MAC1 in port 2. Accordingly, Switch 20 updates its BT 20a. In addition, main computer 23, or 16/n (depending on definitions), is also updated with the latter MAC address changes. Main computer 23, or 16/n, causes TRB 25 to execute a linkage reexamination process, by which the new position of links 25/1 and 25/2 are identified and reported back to the computer 23, or 16/n.

If Switch 20 does not receive a reply message from end-devices on one, or more, of its ports (1 to n, FIG. 2A) within a predetermined time period, the corresponding record(s) in table 24 are left unchanged in table 24, assuming the 'missing' end-device(s) have been switched off. Should the MAC be discovered on a different switch port, or should the link between the access point and the switch be broken (including cross connection) then the station will be removed from table 24 and this station is no longer associated with said access point).

Figure 2B:
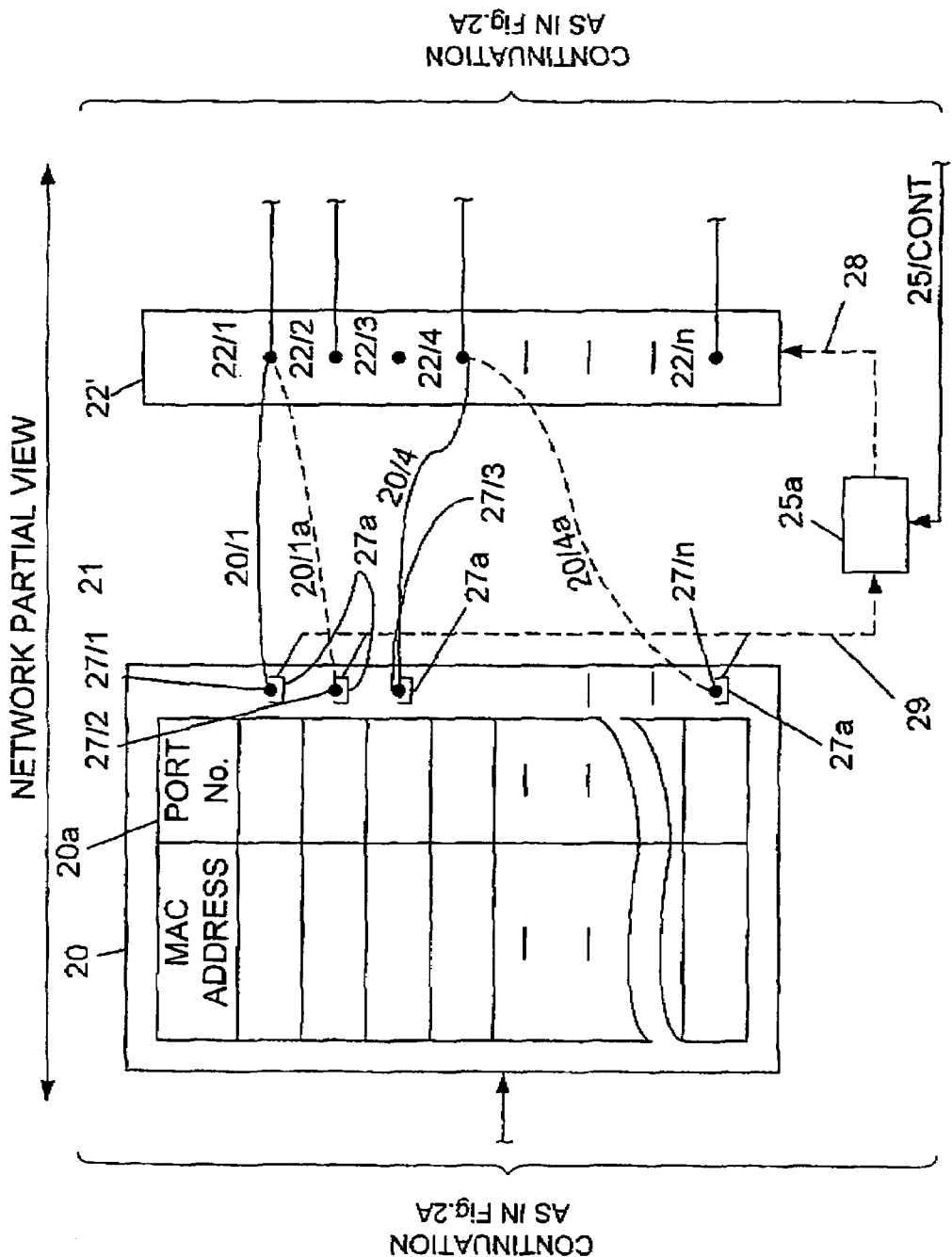
FIG. 2B schematically illustrates a system for determining static and dynamic physical links in a data network, according to another preferred embodiment of the invention.

FIG. 2B schematically illustrates a system for determining static and dynamic physical links in a data network, according to another preferred embodiment of the invention. Static data cords 4/1 to 4/n (FIG. 2A) reside within Switch 20, and data cords, such as 20/1, connect contacts in panel 22' to corresponding contacts 27/1 to 27/n.

There are two alternatives, in which panel 22' might be 'bridged' to Switch 20. According to the first alternative, data cords, such as 20/1, have one end-point that is static, i.e. constantly connected to a corresponding contact in panel 22' (e.g. 22/1), while the other end-point might be connected to either one of the unoccupied ports of Switch 20 (e.g. 27/1). According to the second alternative, data cords, such as 20/1, have two transferable end-points. According to the first alternative, determining links such as 20/1 are carried out by employing TRB 25a and signal bus 29, by storing the static data-cord end-points (i.e. 22/1 to 22/n) and by utilizing detectors 27a, each detector being capable of identifying the data cord that is connected to the corresponding Switch 20 terminal, by detecting a signal that is unique to each data cord in the 'set' of data cords that are connected between specific pairs of panel 22' and Switch 20, and stored in a storage array. The storage array might reside, for example, within TRB 25a, for allowing it to correlate each Switch 20 terminal (i.e. 27/1 to 27/n), to which a cord end-point is connected, with the corresponding terminal in panel 22', to which the other end-point of the corresponding cord is connected.

According to the second alternative, determining links such as 20/1 are carried out by employing TRB 25a and signal buses 28 and 29. In general, this type of data cords arrangement is equivalent the two-panel arrangement depicted in FIG. 2A (i.e. panels 21 and 22). Therefore, the problem of identifying links such as 20/1 is solved in a similar manner, except that detectors 27a (in FIG. 2B) replace panel 21 (in FIG. 2A).

According to another embodiment of the invention (see FIG. 3), a Local Network Area (LAN) network comprises several subnets, such as subnet 1 and subnet 2, that are connected to a Router such as Router 26. Each subnet has a structure that is essentially similar to the subnet structure depicted in FIG. 2A, or in FIG. 2B, and may represent a different department of an organization. For example only two subnets are included in the data network, e.g., subnet 1 and subnet 2. Router 26 serves as a 'gateway' for each subnet, for allowing communication between end-devices in subnet 1 (e.g., end-device 16/1) and end-devices in subnet 2 (e.g., end-device 31). Each subnet includes a transceiver block (TRB) 25, (described with respect to FIG. 2A, or FIG. 2B). Computer 16/n directly controls TRB 25 in subnet 1, as described with respect to FIG. 2A. However, in order to allow computer 16/n (in subnet 1) to obtain the required connectivity data from remote subnets, e.g., from TRB 25 in subnet 2, TRB 25 in subnet 2 is connected to a computer in subnet 2, e.g., computer 31, from which computer 16/n communicates for retrieving the required data that is related to cross-connections between panels 21 and 22 (not shown) in subnet 2.

In order to identify the physical location of each end-device in each subnet (e.g. end-device 16/1 having MAC address MAC1 and being connected to wall outlet #15/1, in room #1; see FIG. 2A), and its corresponding complete end-to-end connectivity (e.g. from Switch 20 port #2 to wall outlet #15/1), the MAC addresses of the connected end-devices must be obtained. Router 26 usually maintains an updated ARP table that includes the MAC address of every end-device that is included in each subnet that is defined on one of its ports. Each MAC address is associated with the corresponding Switch 20 port (e.g. MAC address MAC2 being associated with Switch 20 port 1, FIG. 2A). In the LAN network depicted in FIG. 3, subnet 1 is connected to port 26/1 of Router 26, and subnet 2 is connected to port 26/2 of Router 26. Computer 16/n communicates with Router 26, for retrieving the data that is related to the MAC addresses and associated with specific port of Switch 20.

Subnet detection is executed by utilizing a LANMapper module, and includes mapping all subnets that are part of the LAN system and that are accessible from the defined Router. The LANMapper communicates with the Router by utilizing the Simple Network Management Protocol (SNMP), or another suitable protocol, and retrieves the data related to all subnets connected to it from the routing table that resides within the corresponding MIB-2 table ('MIB'—Management Information Base), and constructs a list of all subnets that are connected to ports of the Router(s). In addition, a list of additional routers is constructed based on the information gathered from the routing table (containing data related to additional subnets connected to said router, as well as to neighboring routers). This process is repeated for each router and hence, a list of subnets which exist in the LAN is obtained. The LANMapper also generates a list of all the end-devices residing on each subnet, which may be used to interrogate those devices, in order to update relevant switch bridge table.

Figure 4:
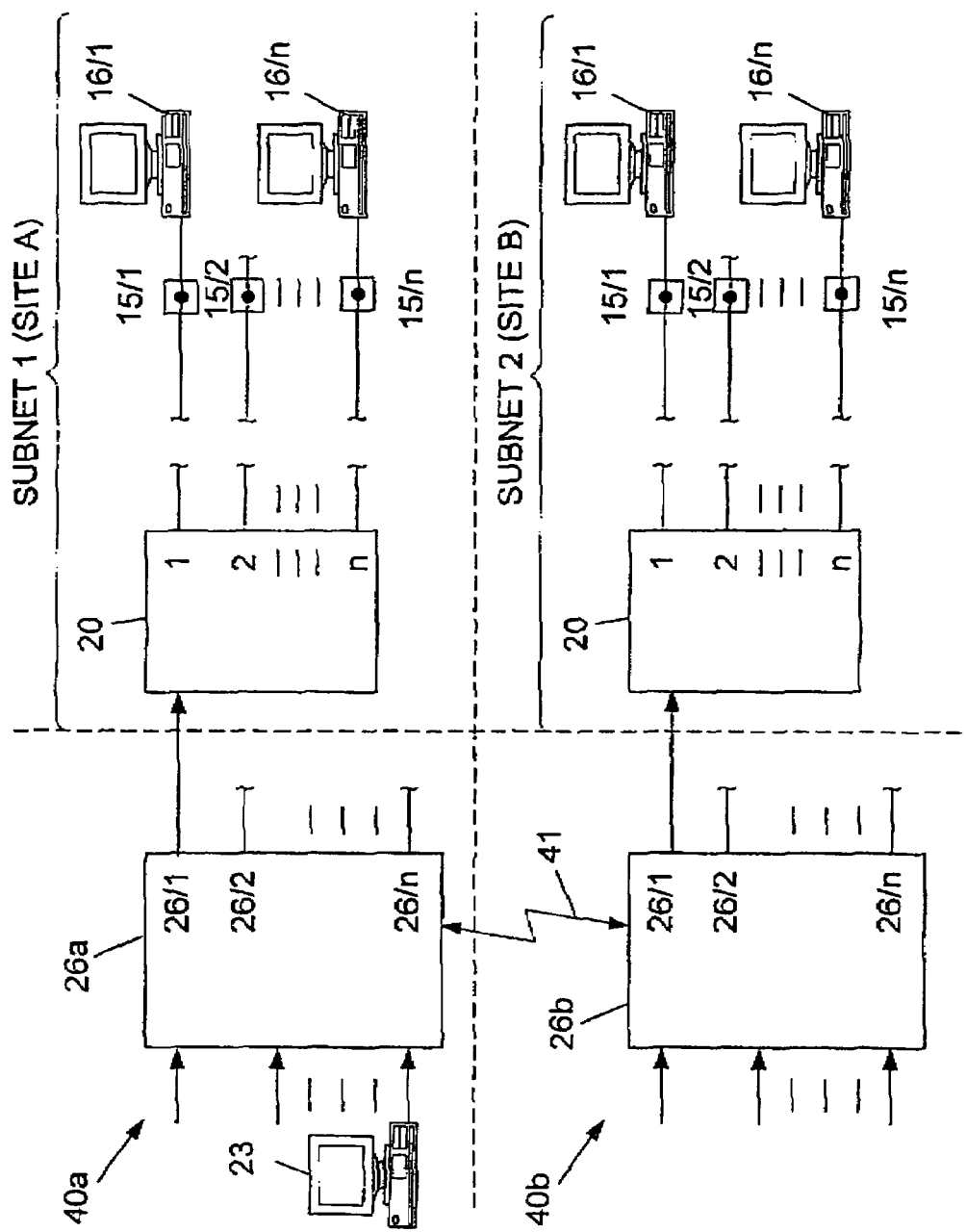
FIG. 4 schematically illustrates an exemplary WAN-based organization data system that is spread over different geographical locations, according to a preferred embodiment of the invention.

FIG. 4 schematically illustrates an exemplary WAN-based organization data system that is spread over different geographical locations, according to a preferred embodiment of the invention. Reference numerals 40a and 40b are each a data network, the basic structure of which is similar to the structure of the data network depicted in FIG. 2A. If SITE A comprises many end-devices, they could be divided into several subnets, each of which could be connected to different ports of Edge Router (ER) 26a, e.g., to ports 26/1 and 26/2 (of ER 26a). SITE B could be handled in a similar manner as SITE A. ER 26a and ER 26b communicate with each other by utilizing leased line 41, for allowing exchanging data between any two end-devices in the WAN network, e.g. between computer 16/1 in SITE A and computer 16/1 in SITE B, and for allowing a main computer, such as computer 23, or computer 16/1 (in SITE A or in SITE B), to obtain data that is related to the physical location and connectivity of each end-device, regardless to which subnet it is connected, or in which site it is located. If there are other sites, in addition to SITES A and B, that should be connected to the data network (e.g., SITE C and SITE D, not shown), additional ERs such as ER 26a, or ER 26b, are required, each one will be associated with specific site. The additional ERs exchange date with other ERs by means of leased lines similar to leased line 41.

Figure 3:
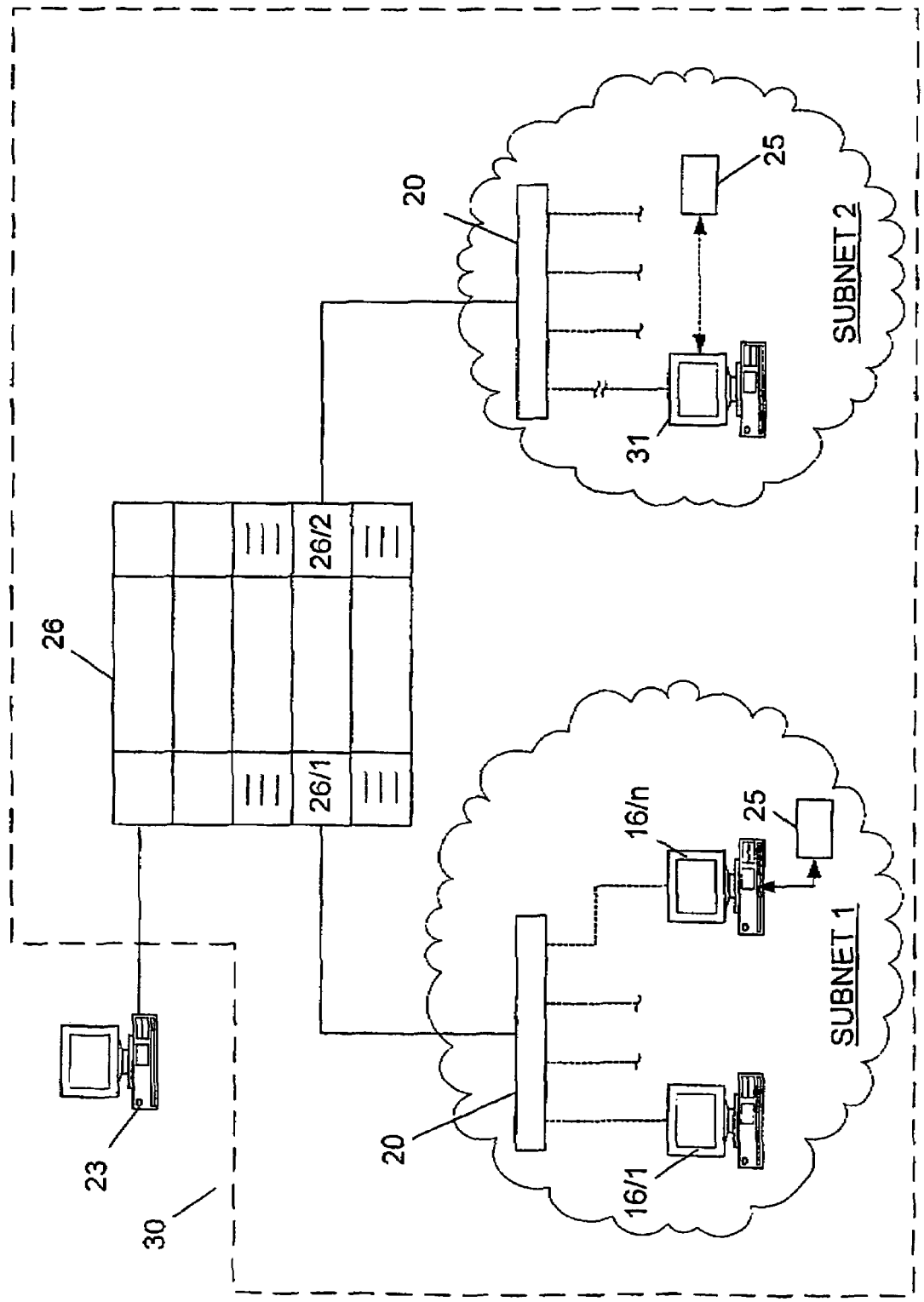
FIG. 3 schematically illustrates an exemplary LAN-based organization data system comprising two subnets that are connected to a router, according to another preferred embodiment of the invention.

According to this embodiment, determining the physical location and connectivity of each end-device in each subnet is carried out in the same manner as in the data network depicted in FIG. 3, since ER 26a and ER 26b (FIG. 4) could be looked upon as extensions, or parts, of one Router, due to the 'point-to-point' nature of the communication (over leased line 41) between them. Hence, the physical location and connectivity of each end-device in the WAN-based network that includes sub-networks 40a and 40b, could be obtained by either utilizing computer 23 or a computer that is included in one of the subnets, e.g., computer 16/n in subnet 1 in SITE A, or computer 16/n in subnet 1 in SITE B.

Figure 5:
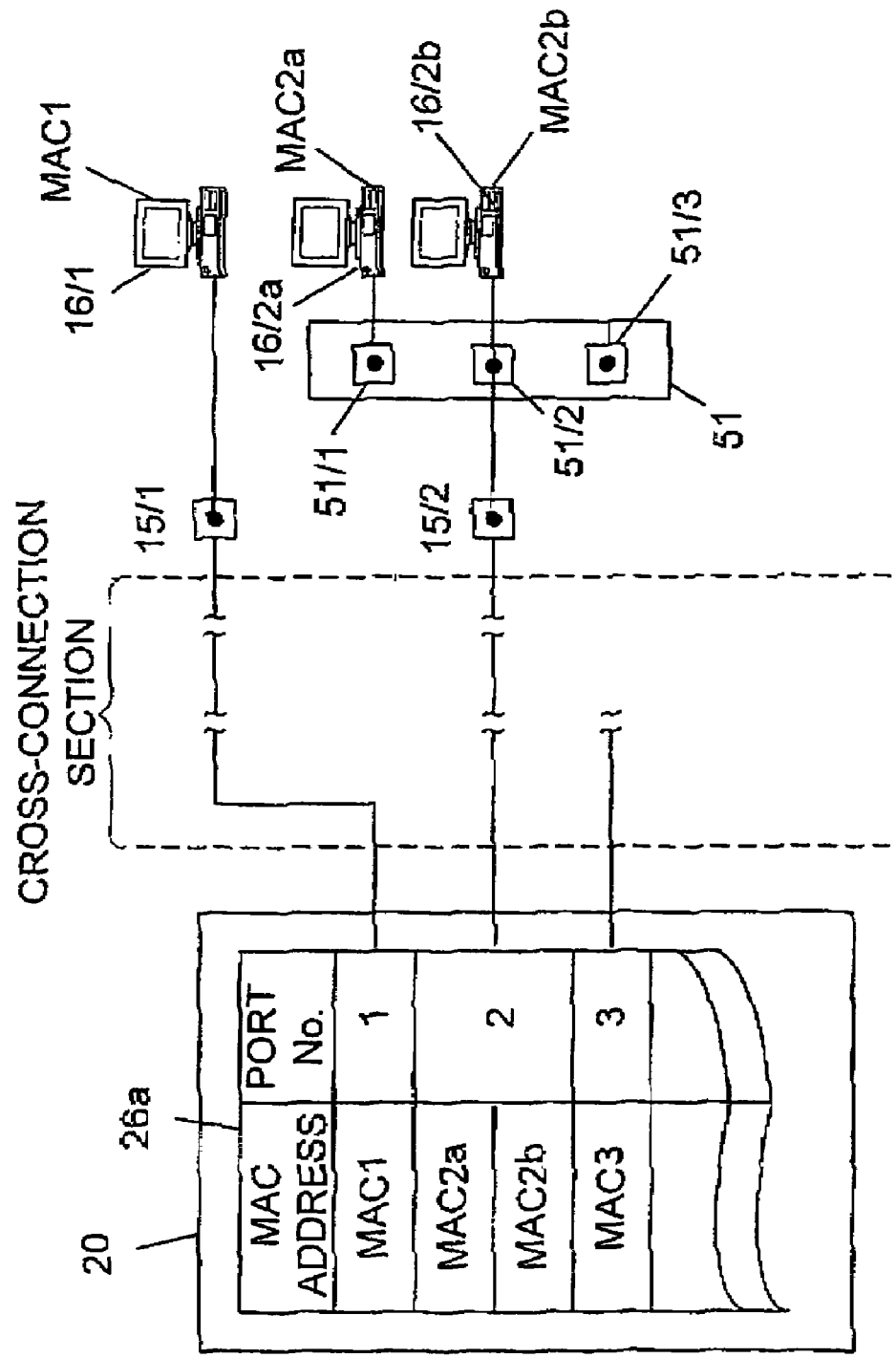
FIG. 5 schematically illustrates a system for determining static and dynamic physical links in a data network, in which several end-devices are connected in parallel, a preferred embodiment of the invention.

According to the invention, the physical location and connectivity of end-devices being connected to a data network at the same access point (by means of e.g. a HUB) can also be obtained, as described in FIG. 5. End-devices 16/2a and 16/2b are connected in parallel to HUB 51 (i.e. to ports 51/1 and 51/2 of the HUB), which is connected to port 2 of Switch 20. Switch 20, being a conventional data switch, is capable of associating a plurality of MAC addresses with same Switch 20 port. Accordingly, MAC2a and MAC2b (FIG. 5) are associated with port 2 of Switch 20.

As described before, Bridge Table (BT) 26a maintains data only for short duration, during which its content is transferred to a main computer that is utilized for managing aspects related to the physical layer of the connected end-devices. As end-devices are added (i.e. connected and activated) to HUB 51, they indicate their presence (and identifying themselves) by sending their MAC addresses to Switch 20 on outgoing messages, for momentarily updating BT 26a. If end-device 16/2 is switched off to its inactive state, or disconnected from outlet 51/1, its MAC address will still be associated with port 2 of Switch 20, said MAC address has been identified on a different Switch 20 port (e.g. port 3). Other HUBs, to which additional end-devices could be connected, could be connected to other (unoccupied) ports of Switch 20, the physical location and connectivity of the latter end-devices could be obtained as described and illustrated above.

Switch 20 has the same function described hereinabove, for example as described in connection with FIG. 2A. The cross-connect section is basically similar to the cross-connect section depicted in FIG. 2A, or in FIG. 2B.

Of course, the tasks performed separately by the switch and the Router may be equivalently implemented by employing a combined device having both switching and routing capabilities.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

What is claimed is:

1. A method for managing a physical layer of a local area data network having a switch at one end, access points connectable to end-devices at another end and one or more patch panels positioned in communication paths between the access points and the switch, the method comprising:

receiving a first set of data related to relations between unique identification data of the end-devices and corresponding ports of the switch;

automatically acquiring by a transceiver block a second set of data related to connectivity of physical dynamic connections associated with the one or more patch panels wherein each of said physical dynamic connections are part of a communication path between a particular access point and a particular port of the switch, and wherein said transceiver block is coupled to said one or more patch panels;

automatically generating by a computational device, based on the first and second sets of data, connectivity data that associate the unique identification data of said end-devices to physical location of said end-devices; and storing the connectivity data in a connectivity table, wherein each of the dynamic connections comprises a removable data cord connected to a first one of said one or more patch panels at one end and to a second one of said one or more patch panels or the switch at a second end to enable alternative communication paths between the end-devices and the switch.

2. The method of claim 1, wherein the connectivity table comprises connectivity data associating the unique identification data of a particular one of said end-devices and physical location data of said particular end-device based on a first datum associating the unique identification data of said particular end-device to a particular one of said ports of said switch and a second datum associating said particular port to a particular one of said access points.

3. The method of claim 2 comprising:
automatically identifying a change in the physical location of said particular end-device; and
updating said connectivity table.

4. The method of claim 2, wherein the first datum is stored in a bridge table of said switch and the method further comprising:
automatically updating said bridge table based on communications sent from said end-devices coupled to the network via a plurality of corresponding ports, said communications comprising unique identification data of the end-devices.

5. The method of claim 2 comprising:
automatically updating said second datum based on signals received from one or more contacts of said one or more patch panels.

6. The method of claim 2, wherein the first datum is stored in a bridge table of said switch and the method further comprising:
sending to said end-devices via a router coupled to said switch interrogation messages based on corresponding IP addresses of said end-devices; and
automatically updating said bridge table based on reply messages received from said end-devices.

7. The method of claim 1 comprising:
determining a complete path of end-to-end physical links between a particular one of said end-devices and a particular one of said ports.

8. The method of claim 1 comprising:
automatically identifying disconnection of a particular one of said end-devices from a particular one of said access points.

9. A system for managing a physical layer of a local area data network having a switch at one end and access points at another end, the system comprising:
one or more patch panels positioned in communication paths between the access points and the switch;
one or more removable data cords, each connected to a first one of said one or more patch panels at one end and to a second one of said one or more patch panels or the switch at a second end;
a transceiver block coupled to said one or more patch panels to automatically acquire data related to connectivity of physical dynamic connections associated with the one or more patch panels;
a computational device to receive a first set of data related to relations between unique identification data of end-devices coupled to the network and corresponding ports of the switch and a second set of data related to the dynamic connections acquired by the transceiver block and to automatically generate, based on the first and second sets of data, connectivity data that associate the unique identification data of said end-devices to physical location of said end-devices; and
a connectivity table to store the connectivity data,
wherein each of the dynamic connections comprises one of said one or more removable data cords to enable alternative communication paths between the end-devices and the switch.

10. The system of claim 9 wherein said connectivity table contains the first set of data associating the unique identification data of said end-devices and the corresponding ports of said switch.

11. The system of claim 9, wherein said switch comprises a bridge table to maintain data representing the relation between the unique identification data and the corresponding ports.

12. The system of claim 9 further comprising a router coupled to said switch, said router having a table containing data associating the unique identification data of said end-devices and IP addresses of said end devices.

13. The system of claim 9, wherein said connectivity table is being updated based on changes of the first and second sets of data.

14. The system of claim 9, wherein the unique identification data is a media access control (MAC) address.

* * * * *